Sept. 15, 1959 W. B. HUGHES ET AL 2,904,508
SOLVENT SEPARATION OF HYDROCARBONS
Filed May 31, 1955
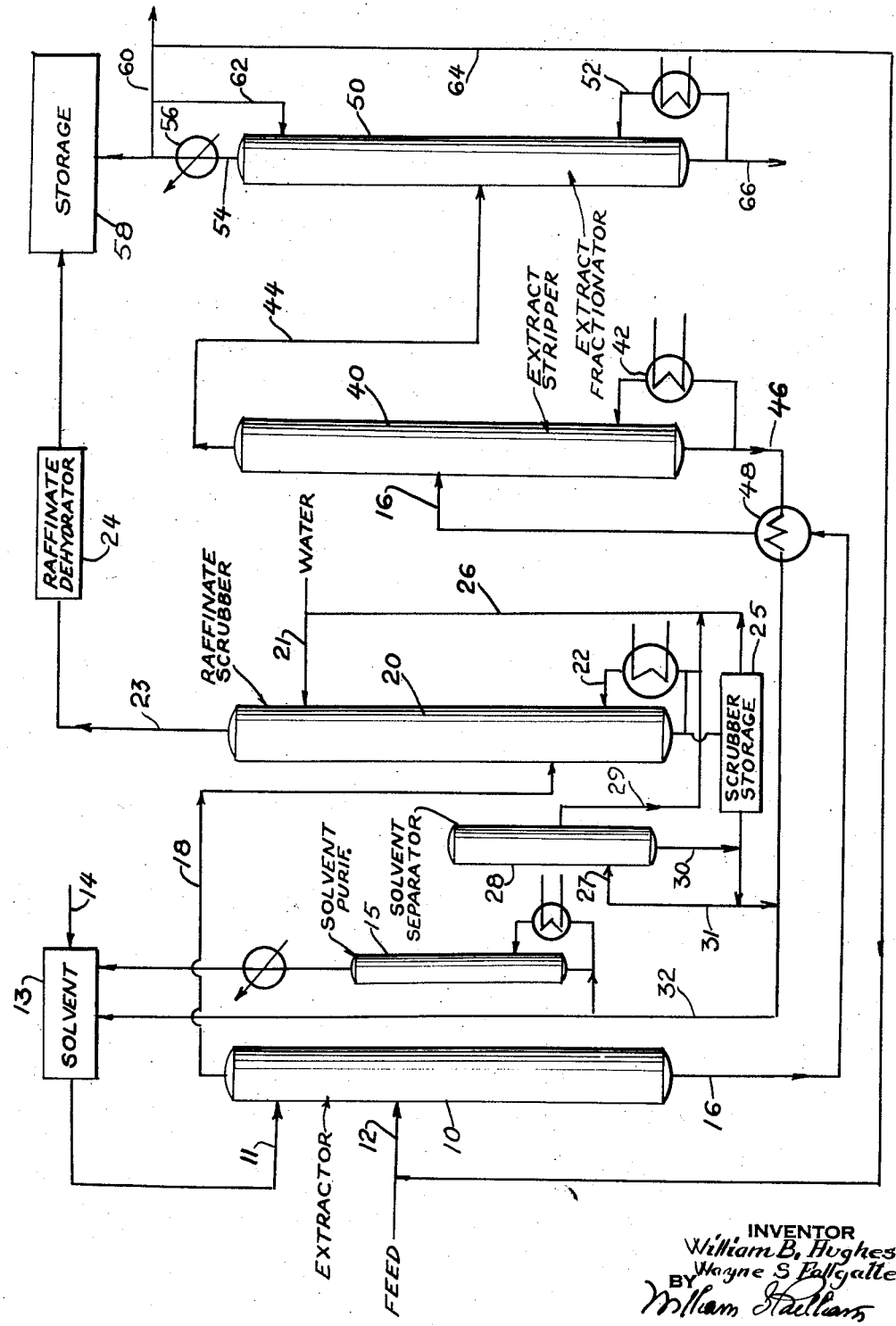
INVENTOR
William B. Hughes
Wayne S Fallgatter
BY
William Fallgatter
ATTORNEY

United States Patent Office 2,904,508
Patented Sept. 15, 1959

2,904,508

SOLVENT SEPARATION OF HYDROCARBONS

William B. Hughes and Wayne S. Fallgatter, Tulsa, Okla., assignors to Cities Service Research and Development Company, New York, N.Y., a corporation of New Jersey Application May 31, 1955, Serial No. 511,938

1 Claim. (Cl. 208—311)

This invention relates to the solvent separation of hydrocarbon mixtures by extraction with a selective solvent comprising 2-anilino-ethanol.

The invention broadly contemplates separating various components of a hydrocarbon mixture including olefinic and aromatic hydrocarbons from a mixture of saturated and unsaturated hydrocarbons by means of a uniquely effective selective solvent 2-anilino-ethanol. This solvent, which may also be referred to as ethoxyl aniline, has been found to be more effective in separating and recovering olefinic and aromatic hydrocarbons from hydrocarbon mixtures of the same than is presently possible by the utilization of known selective aromatic solvents.

The solvent utilized in this invention provides many advantages over the solvents presently used in aromatics recovery, particularly the widely used diethylene glycol solvent. For example, 2-anilino-ethanol can be used on hydrocarbon feed mixtures containing widely varying amounts of aromatics. This is to be contrasted with aromatic recovery using diethylene glycol in which the aromatic content of the feed must under certain conditions be adjusted prior to extraction. The 2-anilino-ethanol solvent of this invention can be used at room temperature and pressure whereas aromatic recovery systems operated with diethylene glycol must be operated at considerably higher temperatures and pressures. A further desirable feature of the 2-anilino-ethanol as a selective aromatic solvent is the fact that no additional material is needed to modify or increase its selectivity as compared with the diethylene glycol extraction systems wherein a critical control of added water is necessary to effect aromatic recovery. Due to the unexpected solvent properties of the 2-anilino-ethanol, we have been able to obtain raffinate streams substantially free of aromatics and at solvent to feed ratios of from 1 to 4 times less than in conventional aromatic recovery operations. Reduction in the solvent feed ratio is of great importance since lower initial investment is obtained as well as considerable savings in utilities.

The 2-anilino-ethanol utilized in this invention is readily prepared and is stable to decomposition at the regeneration temperatures utilized, thereby reducing the quantity of solvent make-up required. We have found that the solvent utilized in this invention will tolerate a comparatively high proportion of contaminants without loss of selectively or efficiency.

The solvent which we have found will produce these improved results in separating or effecting aromatic recovery from hydrocarbon mixtures of the same is the product obtained by reacting one mol of ethylene oxide with two mols of aniline. The reaction is generally initiated at room temperature with a gradual increase to a maximum of about 120° C. in four hours. Reaction time varies between 0.5 and 4 hours depending largely on the temperature at which the reaction is carried out. Recovery of the 2-anilino-ethanol product in yields up to approximately 90% by weight based on the amount of ethylene oxide used can be obtained according to the reaction described. The product 2-anilino-ethanol is a colorless liquid characterized by a specific gravity of 1.110 (20° C.), a refractive index of 1.5812 (20° C.), viscosity of 117 centipoises (20° C.); and boils at 285° C. The compound contains 10.5% nitrogen, has a molecular weight of 137, and a molecular refractivity of 41.76.

In the course of preparing the solvent as described above, we have found that the addition of small amounts of water, less than one volume percent, has a marked favorable influence on the reaction, resulting in an increase in the desired product, without serious contamination from the phenyl diethanol amine which normally results by reaction of a second mol of ethylene oxide.

The 2-anilino-ethanol compound may also be prepared by the reaction of beta chloroethanol and aniline or by reacting ethylene carbonate and aniline. While these methods of preparation are satisfactory, we have found that the described process is preferable.

We have found that the 2-anilino-ethanol compound described above is particularly effective in extracting various aromatic hydrocarbons such as benzene, xylenes, and toluene from hydrocarbon mixtures containing the same. The product streams of various reforming reactions such as hydroforming, platforming and the like, provide mixtures from which desired aromatic compounds can readily be separated by utilizing the 2-anilino-ethanol solvent of this invention. The solvent extraction of such mixtures is carried out under atmospheric conditions of temperature and pressure at which the solvent and the material being extracted remain in the liquid phase. Extraction in the liquid phase provides an extract containing the major portion of the aromatic components originally present in the feed mixture and a raffinate comprising the non-aromatic components of the mixture as well as a small amount of the solvent used.

The extract and raffinate obtained are separated according to conventional distillation techniques to provide the aromatic products desired. Treatment of the extract by stripping or distillation provides substantially complete recovery of solvent which is recycled to the initial solvent extraction operation for the removal of more aromatics from fresh feed.

We have found that in addition to the extraction of aromatic type compounds from hydrocarbon mixtures the 2-anilino-ethanol solvent utilized in this invention also provides effective separation of other hydrocarbon mixtures such as the product streams of polyforming and catalytic cracking reactions. The 2-anilino-ethanol solvent may also be utilized with considerable effectiveness in the separation of other paraffinic and aromatic hydrocarbon mixtures such as in the extraction of lubricating oil stocks.

In carrying out a solvent extraction utilizing the 2-anilino-ethanol solvent according to our invention the hydrocarbon mixture to be extracted is treated in a system such as that shown in Fig. 1. The extraction of a hydrocarbon mixture in the apparatus shown proceeds according to well known techniques of solvent extraction which utilize a selective solvent in which the desired components are preferentially soluble and from which such products can thereafter be recovered in a solvent stripping or recovery operation.

In a solvent extraction operation carried out according to the method of our invention, the hydrocarbon feed mixture may contain from about 10 to about 80% or higher aromatic components. This feed mixture is introduced by way of line 12 to extractor 10. As previously indicated the adaptability of the 2-anilino-ethanol in extracting aromatics from hydrocarbon feed mixtures containing widely varying amounts of the same is one of the distinct advantages of this solvent. Extractor 10 is a conventional extraction column and is operated at atmospheric temperature and pressure. Extractor 10 is provided with a plurality of trays, packing or other means to provide intimate contact between the hydrocarbon feed mixture and the 2-anilino-ethanol solvent. As in many solvent extraction systems, countercurrent contact in which the solvent is introduced into the upper portion of the extraction column as at 11 is preferred. The solvent is withdrawn from storage drum or tank 13. Tank 13 is supplied with solvent from make-up line 14 or from the operation of solvent purification column 15 as hereafter described.

The hydrocarbon feed mixture introduced at 12 is contacted with the 2-anilino-ethanol solvent as it moves downwardly in the column. The solvent and extracted aromatics, which are preferentially soluble in the solvent, form a mixture or phase commonly referred to as the extract or extract phase. This extract phase is withdrawn from the bottom of extractor 10 through line 16 and passed by a pump into the upper part of stripping column 40. The extractor is normally operated with solvent to feed ratios in amounts of about 1:1 though other ratios of solvent to feed may be utilized.

The material remaining after contact with the solvent normally comprising the major amount of the paraffinic components of the original feed mixture is withdrawn from the upper portion of the extractor by way of line 18 and passed to raffinate scrubber 20. This material commonly referred to as the raffinate may also include a small portion of the selective solvent utilized in extractor 10. As previously indicated, the use of 2-anilino-ethanol provides a raffinate substatially free of aromatic components. This is to be contrasted with conventional aromatic recovery systems in which in the absence of extremely high solvent to feed ratios the raffinate may contin as much as 20 to 30% of aromatics. Utilizing 2-anilino-ethanol at solvent ratios of 1:1, however, we obtain raffinate streams containing less than 0.09% aromatics.

To recover the small amount of solvent from the raffinate, water scrubbing is provided in scrubber 20. A reboiler circuit 22 supplied with steam or other heating media is operated to provide a raffinate overhead in line 23 substantially free of solvent. Water carried over in the overhead stream is removed in dehydrator 24 with the aliphatic components being passed to storage drum 58 after dehydration.

Bottoms from scrubber 20 containing the selective solvent and water used in scrubbing are passed to scrubber storage 25. The water separated is withdrawn from storage drum 25 through line 26 and reintroduced by way of line 21 for further scrubbing of the raffinate. Solvent which may contain a small amount of water is withdrawn from scrubber storage 25 through line 27 and introduced into solvent separator 28. Separated water is withdrawn in line 29 and combined with the recycled water in line 26. The solvent substantially free of water is withdrawn from separator 28 in line 30 and passed by way of lines 31 and 32 to solvent purification or directly to solvent storage 13.

The extract, withdrawn as bottoms from extractor 10 is passed to stripper 40 wherein separation of aromatics and solvent is effected. We have found that the operation of the stripping column at a temperature of between about 150° and 175° C. obtains the desired separation between solvent and the dissolved aromatic or olefinic compounds. To provide the desired temperature in stripper 40, a reboiler circuit 42 is utilized.

Aromatic components of the extract removed in stripper 40 are withdrawn as overhead in line 44 and passed to extract fractionator 50. The bottoms product from the stripping operation which comprises the major portion or bulk of solvent required to separate aromatics from the hydrocarbon feed mixture is withdrawn in line 46, cooled in heat exchange with the bottoms of extractor 10 in exchanger 48, combined with the solvent recovered in separator 28 and passed to solvent storage or to solvent purification in column 15 as desired.

We have found that the unique 2-anilino-ethanol has a substantial tolerance to impurities including water, and therefore only a small portion of solvent is generally passed to solvent purification to maintain solvent effectiveness. It is, of course, one of the distinct advantages of utilizing 2-anilino-ethanol as selective solvent for aromatics in that no selectivity modifying material is required. The 2-anilino-ethanol solvent has been found most satisfactory under all conditions without the addition of any modifying chemicals.

The separation of the extract is carried out in fractionator 50 which is normally operated at a temperature of between about 40° and 150° C. Reboiler circuit 52 provides the necessary heat to effect separation of aromatic and aliphatic compounds from any residue or solvent remaining after the stripping operation carried out in stripper 40.

The overhead from fractionator 50 comprising substantially all of the aromatic compounds originally present in the feed including benzene, toluene and xylenes is withdrawn in line 54, cooled in condenser 56 and passed to further separation. Aromatics are removed in line 60 with a small portion being utilized in reflux circuit 62. A portion of the aromatics recovered may be utlized as a recycle. This can be accomplished in line 64 and the amount utilized may constitute as much as 25% of the overhead stream. Heavy residue remaining after aromatic and aliphatic removal is withdrawn in line 66 as a bottoms product. This stream, in addition to containing small amounts of aliphatic and aromatic compounds, may include trace quantities of solvent.

While the foregoing operation generally describes a countercurrent system for continuous operation, it is not intended to so limit the mode of operation of our invention. We have found that the 2-anilino-ethanol solvent utilized herein provides equally effective separation and recovery of aromatics in a batch type operation or in a concurrent system. It is also contemplated that the solvent extraction accomplished with the 2-anilino-ethanol solvent of this invention may be carried out in a single stage or in a multi-stage operation with a variety of columns utilizing mixing or settling vessels to effect separation of the extract and raffinate phases.

When solvent extraction is carried out on hydrocarbon mixtures of the type described, we have found that the unusual solvent power of the 2-anilino-ethanol provides separation of hydrocarbon at solvent to feed ratios considerably lower than heretofore permitted with known aromatic solvents in which aromatic recovery was desired from similar hydrocarbon mixtures. While conventional solvent extraction systems utilize solvent to hydrocarbon feed ratios in the range of from about 1 to 10 or 20 volumes of solvent per volume of feed, we have found that the 2-anilino-ethanol solvent utilized herein effectively extracts aromatics from hydrocarbon feed mixtures at solvent to feed ratios of from 0.5:1 to 2:1. It is to be understood, of course, that a wider ratio of solvent to feed may be utilized if desired; however, increase in the solvent to feed ratio unnecessarily burdens the stripping operation and increases cost of aromatic recovery in terms of quantities of solvents used and tower heat requirements. At the solvent to feed ratio of about 1:1 which we find preferable when utilizing 2-anilino-ethanol in extracting aromatics from compositions such as are obtained in hydroforming operations, we obtain most satisfactory results.

In utilizing the 2-anilino-ethanol solvent, we have found that aromatics and olefinic compounds may be effectively removed from a wide variety of mixtures. In all of the hydrocarbon mixtures treated with the preferred solvent of this invention, we have found substantially improved results over other solvents used in extracting similar mixtures. The mixture of hydrocarbons set forth in Table I which follows is indicative of the type of hydrocarbon mixture which we have found that the 2-anilino-ethanol will effectively separate into the desired aromatic components and the undesirable paraffinic components.

TABLE I

*Fractional distillation of hydroformate*

| Temp. range, ° C. | Vol. percent of charge | Refractive index | | Major aromatic component in cut |
|---|---|---|---|---|
| | | Min. | Max. | |
| Noncondensible-40 | 6.2 | 1.3593 | 1.3593 | |
| 40–68 | 6.1 | 1.3712 | 1.4065 | |
| 68–85 | 5.3 | 1.4087 | 1.4482 | Benzene. |
| 85–101 | 10.8 | 1.3914 | 1.4240 | |
| 101–118 | 20.0 | 1.4260 | 1.4745 | Toluene. |
| 118–136 | 2.8 | 1.4151 | 1.4629 | |
| 136–144 | 1.7 | 1.4719 | 1.4719 | Ethyl Benzene. |
| 137–144 | 28.0 | 1.4790 | 1.4921 | Xylene. |
| 144–163 | 4.3 | 1.4903 | 1.4861 | $C_9$ aromatics. |
| Residue | 11.0 | | | $C_9$ and higher aromatics. |

The effectiveness and selectivity of the 2-anilino-ethanol solvent utilized in this invention in recovering desirable aromatic components from mixtures of hydrocarbons such as that described in Table I above will be apparent from the examples which follow. It is understood that these examples are merely illustrative of the invention and are not intended as limiting or restricting the invention to the quantities of reactants, temperatures, pressures, or other conditions set forth.

EXAMPLE 1

100 gallons of a hydroformate feed containing 62 volume percent aromatics was contacted in a once through operation with 100 gallons of 2-anilino-ethanol in a countercurrent contact system. Mixing of solvent and feed was carried out in a 30 plate bubble tray column at atmospheric temperature and pressure. Raffinate of 22.5 gallons containing the major portion of paraffinic components present in the feed mixture and containing less than 0.09% of aromatics was obtained. The extract containing substantially all the aromatics initially present in the feed together with a small amount of aliphatic material was withdrawn from the bottom of the extraction column and passed to a stripping column. The bottoms product, or extract and solvent, amounted to 177.5 gallons. The stripping column operated at a temperature of about 300° F. provided an overhead product of 77.5 gallons. Stripped 2-anilino-ethanol solvent of approximately 100 gallons was withdrawn from the bottom of the stripping column for further use in extracting aromatics from fresh hydrocarbon feedstocks. Distillation of the 77.5 gallons of the 2-anilino-ethanol extract yielded the following:

| Temp. ° C. | Vol. percent | Gal. | Cut |
|---|---|---|---|
| 50–70 | 4.0 | 3.0 | Aliphatic. |
| 70–80 | 7.0 | 5.4 | Recycle. |
| 80 | 3.0 | 2.3 | Benzene. |
| 80.5–105 | 11.0 | 8.5 | Aliphatic. |
| 105–111 | 30.0 | 25.8 | Toluene. |
| 112–120 | 3.0 | 2.3 | Recycle. |
| 120–144 | 39.0 | 30.2 | Xylenes. |
| | 100.0 | 77.5 | |

The recovery of 58.3 gallons total aromatics from the original feed is equivalent to 93.5 percent specification grade aromatics.

EXAMPLE 2

A hydroformate feed amounting to 100 gallons containing 62 volume percent aromatics was contacted in a once through operation with 25 gallons of 2-anilino-ethanol. 23.5 gallons of raffinate containing 36 volume percent of aromatics and 101.5 gallons of rich extract containing 76.5 gallons of extract was obtained. 53.5 gallons of aromatics representing 86 volume percent of aromatics present in the feed mixture was obtained from the extract.

EXAMPLE 3

100 gallons of hydroformate feed containing 62 volume percent of aromatics was contacted with 130 gallons of 2-anilino-ethanol in a once through operation and provided a raffinate of 22.5 gallons containing no aromatics. 207.5 gallons of rich extract was obtained containing 77.5 gallons of extract. The extract provided 62.0 gallons of aromatics or 98 volume percent recovery of aromatics.

The effectiveness in recovering aromatic constituents from hydrocarbon mixtures containing the same is readily apparent from the foregoing examples. It is to be noted that in Examples 1 and 3 wherein solvent:feed ratios of approximately 1:1 and 1.3:1 were used, the raffinate contained 0% aromatics. Such an effective and complete recovery of aromatics from mixtures of this sort provides a considerable improvement over presently utilized aromatic solvents.

In Table II which follows, comparative data on the solvent effectiveness of the 2-anilino-ethanol solvent of this invention and other known aromatic solvents is provided. These data were obtained under conditions most effective for the particular solvent.

TABLE II

*Extraction of 1000 ml. of 62% hydroformate feed*

| Solvent | Temp., ° F. | Sol./feed ratio | Extract | | |
|---|---|---|---|---|---|
| | | | Ml. | Percent aromatic | Ml. aromatic |
| Diethylene glycol | 325 | 6:1 | 578 | 72 | 416 |
| Diethanolamine | 325 | 9:1 | 512 | 80 | 409 |
| 2-anilino-ethanol | Atm. | 1:1 | 765 | 80 | 608 |
| Triethylene tetramine | Atm. | 1:1 | 738 | 83 | 612 |

It will be noted in the foregoing Table II that the 2-anilino-ethanol is used at atmospheric temperature and pressure without the necessity of a critical water control. The diethylene glycol solvent on the other hand requires elevated temperature as well as a critically controlled water modifier. In addition the diethylene glycol must be used in much greater quantities as evidenced by the high solvent feed ratio.

In Table III which follows, data is provided clearly showing the greater solvent power of 2-anilino-ethanol over other solvents. The data is based on a batch extraction of the same feed stock at the same solvent to feed ratio. Since diethylene glycol and diethanolamine cannot be utilized at room temperature, extraction with these solvents was carried out at 325° F.

TABLE III

*Comparison of solvents at 1:1 ratio. Feed 30% toluene*

| Solvent | Temp., ° F. | Raffinate, percent aromatic | Extract, vol. percent aromatic |
|---|---|---|---|
| Tetraethylene pentamine (5% water) | | 25.8 | 90 |
| Triethylene tetramine | (1) | 23 | 68 |
| Diethylene triamine | (1) | 29 | 77 |
| 2-anilino-ethanol | (1) | 19 | 76 |
| Diethanolamine (5% water) | 325 | 28 | 68 |
| Diethylene glycol (10% water) | 325 | 26 | 75 |

[1] Atm. (80° F.).

The recovery of the various aromatic constituents obtained from the solvent after stripping can be carried out according to well known methods of distillation to provide separation of the aromatics. If it is desirable to obtain the xylenes free from other olefinic compounds, the extracted hydrocarbons may be treated with sulfuric acid for the purpose of removing olefins. Such an acid treatment could also be utilized for the purpose of removing sulfur compounds and other impurities.

In addition to the foregoing, the 2-anilino-ethanol solvent utilized for aromatic recovery, as described herein, may also be used in the extraction of aromatic blending stocks from naphthas or naphtha mixtures. The process also finds application in the treatment of high blending petroleum fractions to obtain raffinates of high cetane number or lubricating oils of high viscosity index.

While we have described our invention as relating primarily to the separation and recovery of aromatics from reformate or hydroformate mixtures containing the same, it is to be understood that many modifications and variations of the invention may be made without departing from the scope or spirit thereof and only those limitations appearing in the appended claim should be imposed on our invention.

We claim as our invention:

A process for separating aromatic hydrocarbons from a hydrocarbon mixture including a major proportion of aromatic hydrocarbons together with a smaller proportion of paraffinic, naphthenic and olefinic hydrocarbons which comprises maintaining the hydrocarbon mixture in contact with a selective solvent comprising 2-anilino-ethanol at a solvent to feed ratio of 1:1 and under substantially atmospheric temperature and pressure for a period of time sufficient to dissolve in the selective solvent substantially all of the aromatic hydrocarbons originally present in the hydrocarbon mixture, withdrawing a raffinate containing substantially all of the paraffinic hydrocarbons of said mixture, water scrubbing said raffinate to remove solvent therefrom, separating water and solvent removed from the raffinate, returning separated water to raffinate scrubbing, withdrawing separated solvent and combining said separated solvent with solvent recovered from the extract, withdrawing an extract from the contact of solvent and feed, stripping said extract at a temperature between about 150° and 175° C. to provide an overhead of aromatics and selective solvent bottoms product, passing said solvent bottoms product in indirect heat exchange with said extract to heat said extract prior to stripping, combining the selective solvent bottoms product after heat exchange with the solvent recovered from raffinate scrubbing, purifying a minor portion of the combined solvent, adding the purified minor portion of combined solvent to the major portion of the combined solvent and passing the total stream of combined solvent of increased purity to contact with the fresh hydrocarbon feed mixture, fractionating the aromatic overhead from the stripping operation to provide an overhead comprising substantially all of the aromatic components of said mixture, passing said aromatic components to further separation, and refluxing the aromatic fractionating column with a portion of the aromatic overhead.

References Cited in the file of this patent

UNITED STATES PATENTS

| | | |
|---|---|---|
| 2,083,893 | Clarke | June 15, 1937 |
| 2,244,521 | Ferris | June 3, 1941 |
| 2,257,547 | Duncan | Sept. 30, 1941 |
| 2,307,242 | Savelli et al. | Jan. 5, 1943 |
| 2,337,732 | Burk et al. | Dec. 28, 1943 |
| 2,364,517 | Burk | Dec. 5, 1944 |
| 2,711,433 | Poffenberger | June 21, 1955 |
| 2,727,854 | Brown et al. | Dec. 20, 1955 |
| 2,770,663 | Grote | Nov. 13, 1956 |
| 2,792,332 | Hutchings | May 14, 1957 |

OTHER REFERENCES

Hodgman et al.: "Handbook of Chemistry and Physics," 35th ed., pages 726 and 902; published by Chemical Rubber Publishing Co., Cleveland, Ohio (1953).

UNITED STATES PATENT OFFICE

CERTIFICATE OF CORRECTION

Patent No. 2,904,508 September 15, 1959

William B. Hughes et al

It is hereby certified that error appears in the printed specification of the above numbered patent requiring correction and that the said Letters Patent should read as corrected below.

Column 5, Example 1, in the table at the bottom of page, second column thereof, under the heading, "Vol. percent", fifth line, for "30.0" read -- 33.0 --.

Signed and sealed this 12th day of April 1960.

(SEAL)
Attest:

KARL H. AXLINE
Attesting Officer

ROBERT C. WATSON
Commissioner of Patents